US011636129B2

(12) United States Patent
Turner (10) Patent No.: US 11,636,129 B2
(45) Date of Patent: Apr. 25, 2023

(54) ACTIVE DATA EXECUTABLE (71) Applicant: Xivvic LLC, Evanston, IL (US)

(72) Inventor: Carlton Reid Turner, Evanston, IL (US)

(73) Assignee: Xivvic, LLC, Evanston, IL (US)

( * ) Notice: Subject to any disclaimer, the term of this patent is extended or adjusted under 35 U.S.C. 154(b) by 364 days.

(21) Appl. No.: 16/926,396

(22) Filed: Jul. 10, 2020

(65) Prior Publication Data
US 2021/0011924 A1 Jan. 14, 2021

Related U.S. Application Data (60) Provisional application No. 62/873,670, filed on Jul. 12, 2019.

(51) Int. Cl.
*G06F 16/00* (2019.01)
*G06F 16/25* (2019.01)
*G06F 16/21* (2019.01)
*G06F 16/2457* (2019.01)
*G06F 16/248* (2019.01)

(52) U.S. Cl.
CPC .......... *G06F 16/252* (2019.01); *G06F 16/219* (2019.01); *G06F 16/248* (2019.01); *G06F 16/24573* (2019.01); *G06F 16/254* (2019.01)

(58) Field of Classification Search
CPC ............. G06F 16/219; G06F 16/24573; G06F 16/248; G06F 16/252; G06F 16/254
See application file for complete search history.

(56) References Cited

U.S. PATENT DOCUMENTS

| 7,296,226 | B2 | 11/2007 | Junkermann |
| 7,313,576 | B2 | 12/2007 | Clark et al. |
| 8,108,854 | B1 | 1/2012 | Wiggins et al. |
| 2014/0195514 | A1 | 7/2014 | Stein |

FOREIGN PATENT DOCUMENTS

WO 0201415 A2 1/2002

OTHER PUBLICATIONS

Hoi et al., "Active Kernel Learning," Appearing in Proceedings of the 25th International Conference on Machine Learning, 2008, pp. 400-407. (Year: 2008).*
Rajgarhia et al., "Performance and Extension of User Space File Systems," SAC'10 Mar. 22-26, 2010, ACM, pp. 206-213. (Year: 2010).*
RedHat—Products & Services Knowledgebase—How Does Kernel Make Decisions for Adding Routes to Reach a Destination if the Interfaces are in Same Network in RHEL—https://access.redhat.com/solutions/1236243—pp. 1-2, printed Nov. 15, 2022. (Year: 2022).*

(Continued)

*Primary Examiner* — Cheryl Lewis
(74) *Attorney, Agent, or Firm* — Lee Sullivan Shea & Smith LLP (57) ABSTRACT

In example embodiments, computing systems may be configured to create, transmit, receive, store, and execute an active data executable comprising (i) a representation of given data content that is combined with (ii) an executable kernel that, when executed, causes the given data content to be extracted in a user-specified data format and provided to a user-specified destination location for storage.

20 Claims, 7 Drawing Sheets (56) References Cited

OTHER PUBLICATIONS

Harper, Jelani, "Data Modeling Tomorrow: Self-Describing Data Formats", AnalyticsWeek, https://analyticsweek.com/content/data-modeling-tomorrow-self-describing-data-forma/, Oct. 10, 2017, downloaded from the Internet Apr. 25, 2019, 3 pages.

Walsh et al., "Data Package: Frictionless Data Specs", Frictionless Data Specs, https://specs.frictionlessdata.io/data-package/, May 2017, downloaded from the Internet Jul. 14, 2020, 9 pages.

* cited by examiner

ACTIVE DATA EXECUTABLE

CROSS-REFERENCE

This application claims the benefit of priority under 35 USC § 119(e) to U.S. Provisional Application Ser. No. 62/873,670 filed on Jul. 12, 2019 and entitled "Active Data Executable," the contents of which are herein incorporated by reference in entirety.

BACKGROUND

When transferring data content from one computing system to another, several issues need to be addressed. For example, a format for the data content typically needs to be specified so that it is useable by the receiving system. For instance, when delivering data content as a traditional data file, the data format could take a number of forms, such as a comma-separated-value (CSV) format, an Extensible Markup Language (XML) format, a JavaScript Object Notation (JSON) format, a Parquet format, an Optimized Row Columnar (ORC) format, or an Avro format, etc. However, in some cases, the format in which the data content is transferred may not be usable by the receiving system (e.g., the receiving system may not be capable of reading and/or processing data that has been encoded in certain formats), in which case conversion tools and/or other manipulation at the receiving system may be needed in order to reformat the data into a useable form.

Once the data is in a useable format and received by the receiving system (e.g., via a transfer container such as a file), the data is typically stored at a location accessible by the receiving system where it can be combined with other data and accessed by other programs and processes. For example, the receiving system may store the received data by moving it from the transfer container to a storage location, such as a database. This may involve additional preparation and processing of the data, to ensure that it follows the same schema as the other data with which it is to be combined. For example, the data may be processed to include rows and columns, field names, date formats, and the like that are consistent with other data in a database. As another example, the delivered data may have content not relevant to the receiving system, which may require filtering of some content. Again, this preparation of the data by the receiving system for storing in a designated destination location frequently requires additional tools or other manipulation to appropriately prepare the data.

Although there may be many variations to the generalized discussion above, it is clear that providing data to a receiving system and making it useable by that system can often be a cumbersome process and the burden of performing the adaptation is typically borne by the recipient of the data. Therefore, any tool or mechanism that can make one or more portions of this process more efficient is desired.

SUMMARY

In one aspect, disclosed herein is a non-transitory computer readable medium having stored thereon: an active data executable (ADE) comprising (i) a representation of given data content that is combined with (ii) an executable kernel that, when executed, causes the given data content to be extracted in a user-specified data format and provided to a user-specified destination location for storage.

In example embodiments, the ADE may further comprise program instructions for providing a user interface allowing a user to indicate (a) the user-specified data format and (b) the user-specified destination location for the given data content. In one possibility, the user interface may further enable a user to provide access information for the user-specified destination location for the given data content. In another possibility, the user-specified destination location for the given data content may be selectable from a set of different destination locations comprising at least two of a filesystem of the computing system, a relational database, a non-relational database, a message queue, a distributed log system, or a cloud storage system.

In further example embodiments, the ADE may comprise a connector library that contains connectors for two or more different types of destination locations. Further yet, in example embodiments, the ADE may comprise metadata information including one or more of (a) execution controls for the ADE, (b) endpoint configuration information for two or more different types of destination locations, or (c) content schema for the given data content.

In yet further example embodiments, the representation of the given data content may be in a form that is independent of any user-specified format in which the given data content is to be extracted.

Still, in further example embodiments, the ADE may further comprise resources for obtaining an updated version of the given data content after execution of the ADE.

In another aspect, disclosed herein is a method comprising (i) creating an active data executable (ADE) comprising (a) a representation of given data content that is combined with (b) an executable kernel that, when executed, causes the given data content to be extracted in a user-specified data format and provided to a user-specified destination location for storage and (ii) transmitting the ADE, via a communication network, to a computing system.

In yet another aspect, disclosed herein is a computing platform comprising a communication interface, at least one processor, and at least one non-transitory computer readable medium having program instructions that are executable such that the platform is configured to perform one or more functions disclosed herein.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, some examples of which are contemplated herein.

The present disclosure is generally directed to an active data executable (ADE) that can deliver data content from a source computing system to a receiving computing system in such a way that allows the data content to be extracted into a specified data format and stored at a specified destination location after the data content is received by the receiving system. The ADE may also provide control mechanisms to secure the data content. In accordance with the present disclosure, the ADE may be a data package that includes data content to be transferred to a receiving computing system (e.g., data content requested by a user of the given receiving system) along with an executable kernel that can be utilized by the receiving computing system to extract the data content in one or more formats specified by a user of the receiving computing system after the data package is received by the receiving computing system. Additionally, the ADE may also include resources that enable a user of the receiving system to specify, after the data package is received by the receiving system, the destination location(s) where the data content is to be stored, and the ADE takes responsibility for causing the data content to be stored at the specified destination location. For example, the ADE may provide the user with the option to specify one or more destination location for storing the extracted data content, such as a relational database, a filesystem location, a messaging system, or a distributed log system, etc. The executable kernel may then extract the data content in the specified format, prepare the data content for the specified destination location as necessary, and then cause the data content to be stored at the destination location specified by the user.

As one specific example to illustrate, if the appropriate destination location for the requested data content is a filesystem of the receiving system, the user of the computing system may specify a file format for the data content (e.g., a CSV file, an XML file, JSON, a Parquet file, an ORC file, or an Avro file) as well as the destination directory and file name for the formatted data content. After receiving the user specification, the ADE may then extract the data content in the specified file format and cause the data content to be stored at the specified destination location.

As another example, if the desired destination location for the data content is a relational database, the user of the receiving system may specify that the data content is to be encoded in a relational database format and provide the database connection details, such as the server name, port number, user name and password, as well as the names of the target database and table to receive the data. Further, the user may specify whether to INSERT, UPSERT, or MERGE the data content into the target table. In this scenario, after receiving the user specifications, the ADE may construct and execute the appropriate SQL statements or bulk load commands to cause the requested data content to be stored in the destination database. Furthermore, if the user has heightened security concerns, the ADE may produce the SQL statements as an output rather than executing them directly, thus allowing a strict separation between resource credentials and a potentially untrusted ADE execution kernel.

As yet another example, if the desired destination location for the data content is a distributed log such as Apache Kafka, the user of the receiving system may specify that the requested data content is to be encoded in a distributed log format. The ADE may use an internal Kafka Publication Library to publish the data content to the distributed log using a message key and content serialization details configured via the ADE's interaction with the user of the receiving system. Specifically, each data record contained within the ADE may be published as a log message with a key constructed from some combination of the record's values and environment context.

The ADE disclosed herein may be capable of extracting data content in various other formats and storing the data content in various other types of destination locations as well.

The ADE discussed herein may provide numerous advantages over existing solutions.

For instance, in many conventional data transfer scenarios, a source system may distribute data content as a data file, multiple data files, or an archive of multiple files (such as a zip file or tar file) to a receiving system. In these situations, a single format for the data content is determined up front and established at the source system. A user of the receiving system must then take certain actions, such as creating a parser, using an ETL (extract, transform, load) tool, or employing some other import mechanism which may or may not be associated with the receiving system, in order to extract the data from the file(s).

Many existing solutions do not include a user interface that is combined with the transferred data content, nor is there a need for one. Rather, the data content is simply transferred as a file or an archive of files. Further, there is no mechanism provided within the transferred archive to store the data content into a particular destination location, such as a database. The burden of doing so, along with any additional configuration or preparation of the data content that may be required, is placed on the receiving system and/or a user thereof. The transferred data content is passive and needs an external process or a compatible extractor, which may or may not be readily available on the receiving system, to be incorporated for use.

Similarly, some existing solutions involve self-extracting archives that consist of a data file or files combined with an executable kernel that extracts the data as pre-formatted files to some location in the receiving system's file system. However, the data content that is produced from the self-extracting archive has the same format it had when it was archived at the source system and is not able to be translated to an alternate format by the self-extracting archive. Self-extracting archives are designed to deliver the files embedded in the archive executable rather than deliver data content. The file's exact original content is replicated by the self-extracting archive for use by the receiving system, regardless of the receiving system's requirements. Further, such self-extracting archives have no ability to interact with the ultimate destination location on the receiving system to store the data content in the destination location. Such solutions still force the receiving system to provide some other mechanism (e.g., a program such as a parser or an ETL tool, which can then extract the requested data content) in addition to the self-extracting archive to extract the data content and then store it into the desired destination location.

Accordingly, the ADE discussed herein may improve upon these and other existing solutions by providing a receiving system with the ability to receive a data package with the built-in capability to format and store data content according to the needs of the receiving system and/or a user thereof, which may be specified by the user of the receiving system after the data package is received by the receiving system. The ADE may accomplish this by embedding, within the ADE itself, the resources necessary to format the data content according to a user's specifications and interact with a variety of potential destination locations to cause the data content to be stored at a particular destination location. Additionally, the ADE may also include resources for providing a user interface (UI), such as a text-based user interface (TUI) or graphical user interface (GUI), that facilitates interaction with a user of the receiving computing system that has received the ADE (e.g., by prompting the user for information and receiving the user's specifications). The ADE may also include controls for supporting data security such as requiring access information (e.g., confidential credentials) or environmental conditions in order to access the data content. Further, the ADE may include additional resources that enable it to connect to the source system, allowing the ADE to retrieve updated content over time without requiring additional direct interaction with the source system by the receiving system and/or a user thereof.

I. Example Network Configuration

Figure 1:
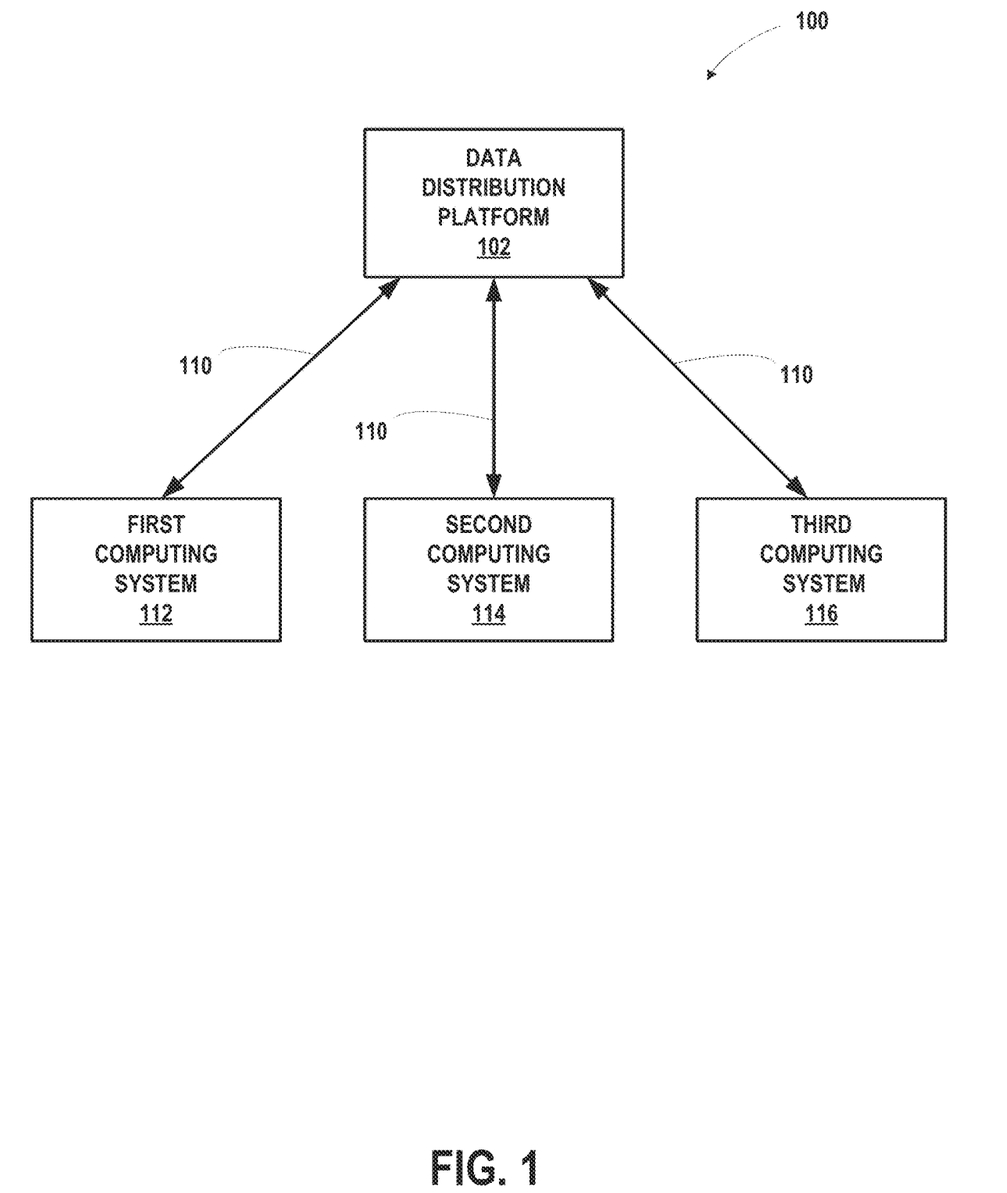
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a data distribution platform 102 that may be communicatively coupled to one or more computing systems, depicted here, for the sake of discussion, as three computing systems 112, 114, and 116. The data distribution platform 102 may take the form of a data warehouse, a software as a service (SaaS) platform, or any other computing system, platform, or combination thereof that is configured to perform the functions discussed herein.

Broadly speaking, data distribution platform 102 may comprise one or more computing systems that have been provisioned with software for carrying out one or more of the functions discussed herein, including but not limited to receiving requests for data content from one or more of the computing systems 112, 114, 116, retrieving the requested data content, preparing the data content in a representation that is destination-agnostic (e.g., a format that is independent of any particular destination location), assembling an ADE including the destination-agnostic representation of the data content and resources (e.g., program instructions, configuration information, etc.) for controlling, formatting and storing the data content, and transmitting the assembled ADE to the one or more of computing systems 112, 114, 116. The one or more computing systems of data distribution platform 102 may take various forms and be arranged in various manners.

For instance, as one possibility, data distribution platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates data distribution platform 102 may either supply its own cloud infrastructure or may obtain the cloud infrastructure from a third-party provider of "on demand" computing resources, such as Amazon Web Services (AWS) or the like. As another possibility, data distribution platform 102 may comprise one or more dedicated servers that have been provisioned with software for carrying out one or more of the functions disclosed herein. Other implementations of data distribution platform 102 are possible as well.

As further depicted in FIG. 1, data distribution platform 102 is configured to interact with one or more computing systems 112, 114, 116 over respective communication paths 110. Computing systems 112, 114, 116 may take any of various forms, examples of which may include a desktop computer, a laptop, a netbook, a tablet, a smartphone, and/or a personal digital assistant (PDA), among other possibilities.

Each communication path 110 between data distribution platform 102 and one of computing systems 112, 114, 116 may generally comprise one or more communication networks and/or communications links, which may take any of various forms. For instance, each respective communication path 110 with data distribution platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with data distribution platform 102 may be wireless, wired, or some combination thereof, and may carry data according to any of various different communication protocols. Although not shown, the respective communication paths 110 with data distribution platform 102 may also include one or more intermediate systems. For example, it is possible that data distribution platform 102 may communicate with a given computing system 112, 114, 116 via one or more intermediary systems, such as a host server (not shown). Many other configurations are also possible.

The interaction between computing systems 112, 114, 116 and data distribution platform 102 may take various forms. As one possibility, one or more of computing systems 112, 114, 116 may send a request to data distribution platform 102 for certain data content. In response to the request, the data distribution platform 102 may assemble an ADE, as discussed herein, containing the requested data content. The data distribution platform 102 may then transmit the ADE to the requesting computing system(s). As another possibility, data distribution platform 102 may be configured to "push" certain types of data content in an ADE to one or more of computing systems 112, 114, 116 (e.g., based on a schedule and/or in response to determining that data content has been updated). The interaction between computing systems 112, 114, 116 and data distribution platform 102 may take various other forms as well.

In practice, computing systems 112, 114, and 116 may each be operated by and/or otherwise associated with a different user. Further, while FIG. 1 shows an arrangement in which three particular computing systems are communicatively coupled to data distribution platform 102, it should be understood that an arrangement may include more or fewer computing systems. Although not shown in FIG. 1, data distribution platform 102 may also be configured to receive data content from one or more external data sources. These data sources—and the data content output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Computing Platforms

Figure 2:
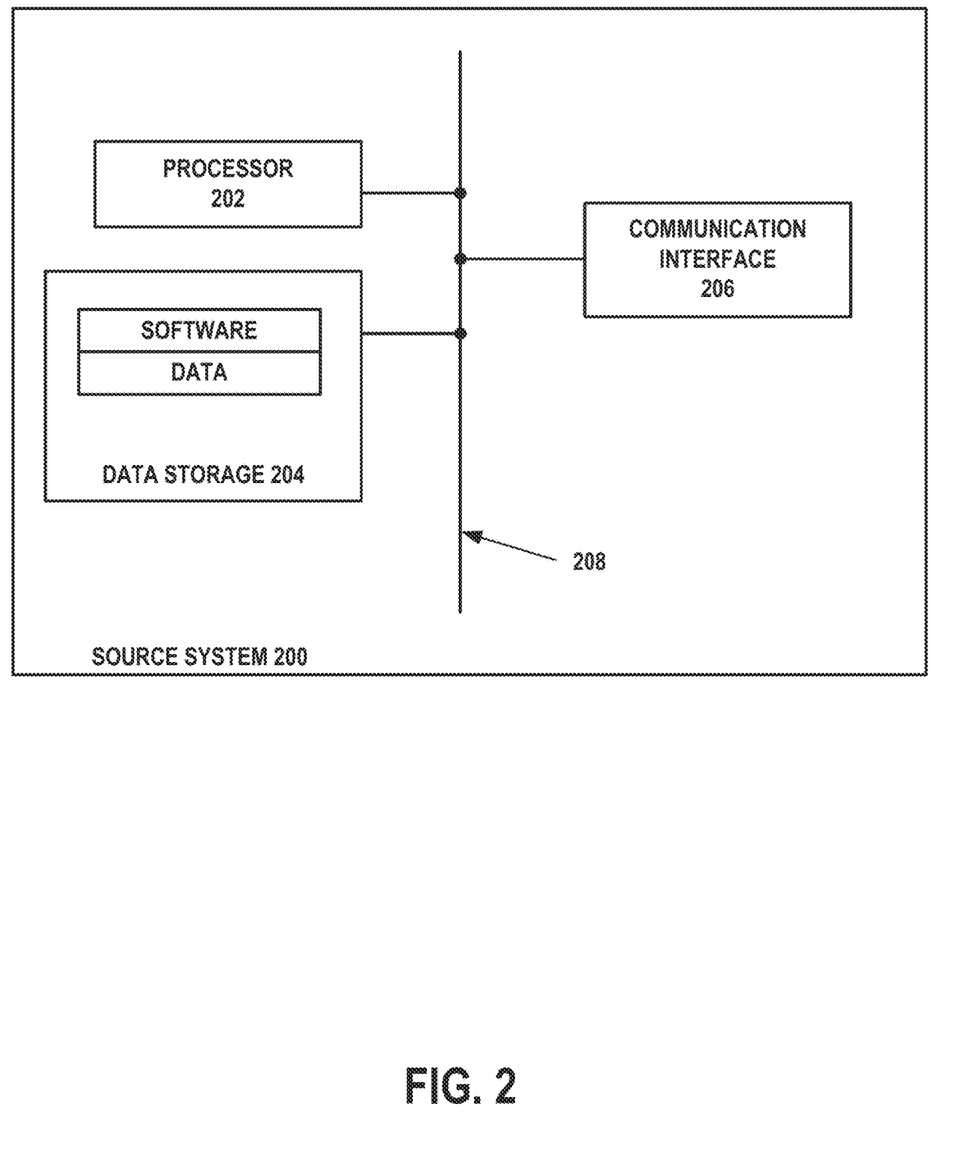
FIG. 2 depicts an example source system computing platform that may be configured to carry out functions of the present disclosure.

FIG. 2 is a simplified block diagram illustrating some structural components that may be included in an example source system 200, which could serve as the data distribution platform 102 in FIG. 1. In line with the discussion above, the source system 200 may be a computing platform generally comprising one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc., and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As discussed above, the source system 200 may serve as the data distribution platform 102 shown in FIG. 1 and may receive data content from various data sources. Further, data storage 204 shown in FIG. 2 may be arranged to store the received data content in one or more databases, file systems, or the like. In some examples, the source system 200 may store received data content in the format in which it is received, such as CSV, XML, or JSON file formats, etc.

In general, the format of given data content is independent of the data content itself. In other words, the same data content may be expressed in many different formats, such as a CSV, an XML, a JSON, a Parquet, an ORC, or an Avro file format, among others, depending on the needs of a given receiving computing system and/or a given user. In some implementations, the source system 200 may receive data content in one or more of the formats discussed above, store the data content in data storage 204 in its originally encoded file format or in another internal format, and, upon receiving a request for the stored data content from a receiving system, then create a destination-agnostic representation of the data content to transmit to the receiving system. In other implementations, the source system 200 may receive data content in one or more of the formats discussed above and then create a destination-agnostic representation of the data content before storing it in data storage 204. In other words, the source system 200 may store the data content in its raw form, independent of any association to a particular file format, thus allowing the data content to then be readily formatted according to a variety of format types based on specifications provided by a user of the receiving system. This may facilitate the creation of an ADE that provides the choice of how to format the data content to a user, as further discussed below. Other possibilities for storing data content in data storage 204, including combinations of the examples discussed above, are also possible.

As shown in FIG. 2, data storage 204 may contain program instructions (which may be arranged together into software applications, virtual machines, software development kits, toolsets, or the like) that are executable by the processor 202 to carry out various functions, including but not limited to the functions disclosed herein.

For example, data storage 204 may include program instructions for creating an ADE, which may comprise data content to be transmitted to a receiving system (e.g., data content that is requested by a user of the receiving system) that has been packaged with an executable kernel and perhaps other resources (e.g., configuration information, security restrictions, etc.) that facilitate formatting and/or storing of the data content by the receiving system. The executable kernel that is packaged into an ADE may contain program code and configuration information for extracting the data content from the ADE in one or more formats selected by a user of the receiving system. Further, the executable kernel that is packaged into an ADE may contain data libraries or similar code that enable the data content to be prepared and cause it to be stored into to a wide range of possible destination locations. Further yet, the other resources that are packaged into an ADE may include various metadata, connector libraries, and UI code and libraries.

Data storage 204 may include various other program instructions and data as well.

Communication interface 206 may be configured to facilitate wireless and/or wired communication with data sources and output systems, such as computing systems 112, 114, 116 in FIG. 1. Additionally, in an implementation where the source system 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, the source system 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the source system 200.

It should be understood that the source system 200 is one example of a source system that may be used with the embodiments described herein. Numerous other arrangements are possible and contemplated herein. For instance, other source systems may include additional components not pictured and/or more or less of the pictured components.

Figure 3:
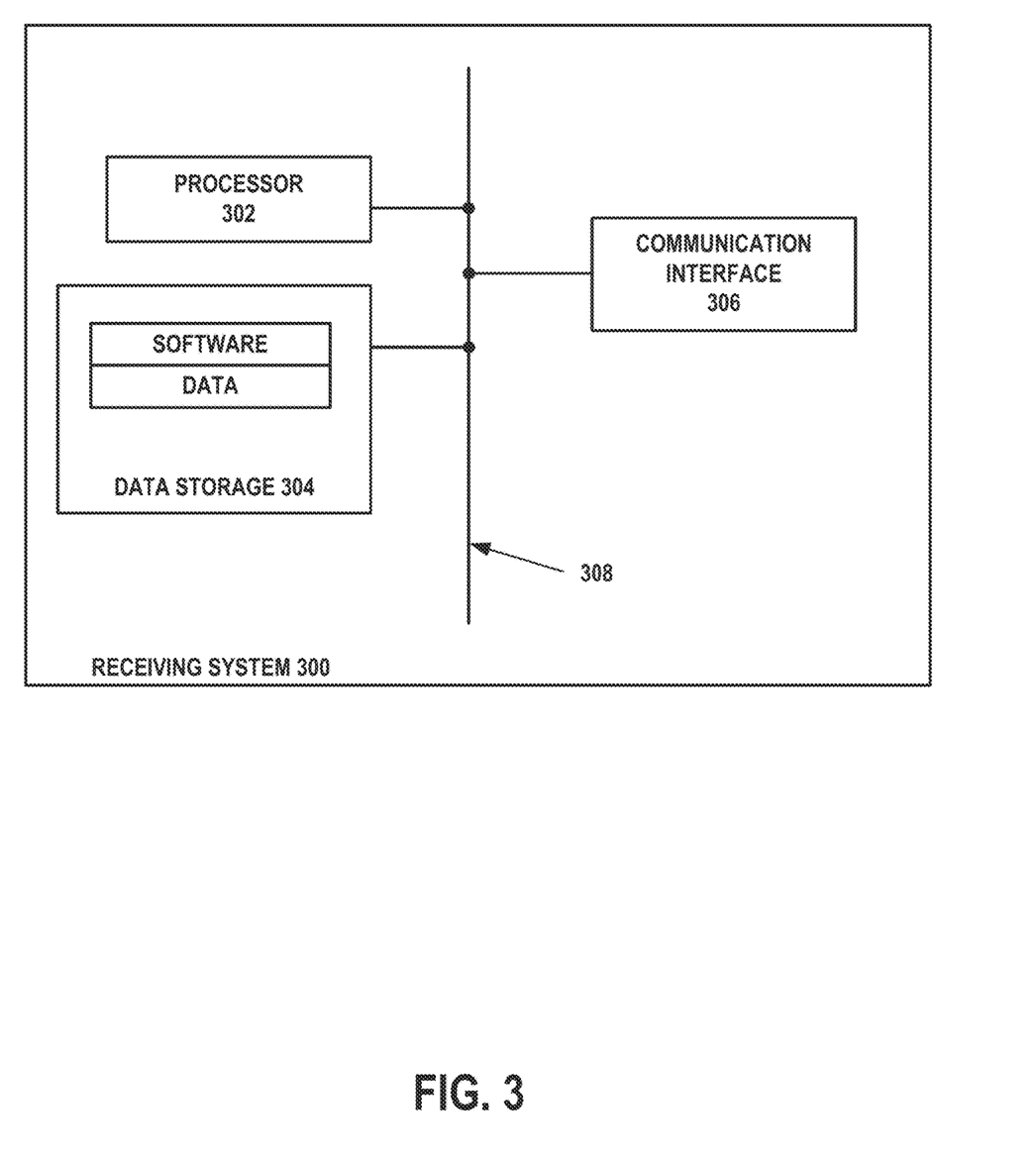
FIG. 3 depicts an example receiving system computing platform that may be configured to carry out functions of the present disclosure.

FIG. 3 is a simplified block diagram illustrating some structural components that may be included in an example receiving system 300, which could serve as the any of the computing systems 112, 114, or 116 in FIG. 1. In line with the discussion above, the receiving system 300 may be a computing platform generally comprising one or more computer systems (e.g., one or more servers), and these one or more computer systems may collectively include at least a processor 302, data storage 304, and a communication interface 306, all of which may be communicatively linked by a communication link 308 that may take the form of a system bus, a communication network such as a public, private, or hybrid cloud, or some other connection mechanism.

Processor 302 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 302 could comprise processing components that are distributed across a plurality of physical computing devices connected via a network, such as a computing cluster of a public, private, or hybrid cloud.

In turn, data storage 304 may comprise one or more non-transitory computer-readable storage mediums, examples of which may include volatile storage mediums such as random-access memory, registers, cache, etc., and non-volatile storage mediums such as read-only memory, a hard-disk drive, a solid-state drive, flash memory, an optical-storage device, etc. In line with the discussion above, it should also be understood that data storage 304 may comprise computer-readable storage mediums that are distributed across a plurality of physical computing devices connected via a network, such as a storage cluster of a public, private, or hybrid cloud.

As shown in FIG. 3, data storage 304 may contain program instructions (which may be arranged together into software applications, virtual machines, software development kits, toolsets, or the like) that are executable by the processor 302 to carry out various functions, including but not limited to the functions disclosed herein. Further, in line with the present disclosure, data storage 304 may also contain an ADE that is received from a source system, and that ADE, when executed by the processor 302, may cause the receiving system 300 to extract data content from the ADE in a user-specified data format and then provide the extracted data content to a user-specified destination location for storage. Data storage 304 may contain various other program instructions and data as well.

Communication interface 306 may be configured to facilitate wireless and/or wired communication with data sources and output systems, such as the data distribution platform 102 in FIG. 1. Additionally, in an implementation where the receiving system 300 comprises a plurality of physical computing devices connected via a network, communication interface 306 may be configured to facilitate wireless and/or wired communication between these physical computing devices (e.g., between computing and storage clusters in a cloud network). As such, communication interface 306 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 306 may also include multiple communication interfaces of different types. Other configurations are possible as well.

Although not shown, the receiving system 300 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the receiving system 300.

It should be understood that the receiving system 300 is one example of a receiving system that may be used with the embodiments described herein. Numerous other arrangements are possible and contemplated herein. For instance, other receiving systems may include additional components not pictured and/or more or less of the pictured components.

III. Example Operations

As mentioned above, the example ADE discussed herein may provide improvements on both sides of a given transfer of data content. In particular, both the source system where the requested data content is originally housed and the receiving system that initiates the request for the data content and/or otherwise receives the data content (along with an associated user of the receiving system) may benefit from the advantages provided by the ADE. These and other examples are discussed in more detail below.

A. Active Data Executable Components

Figure 4:
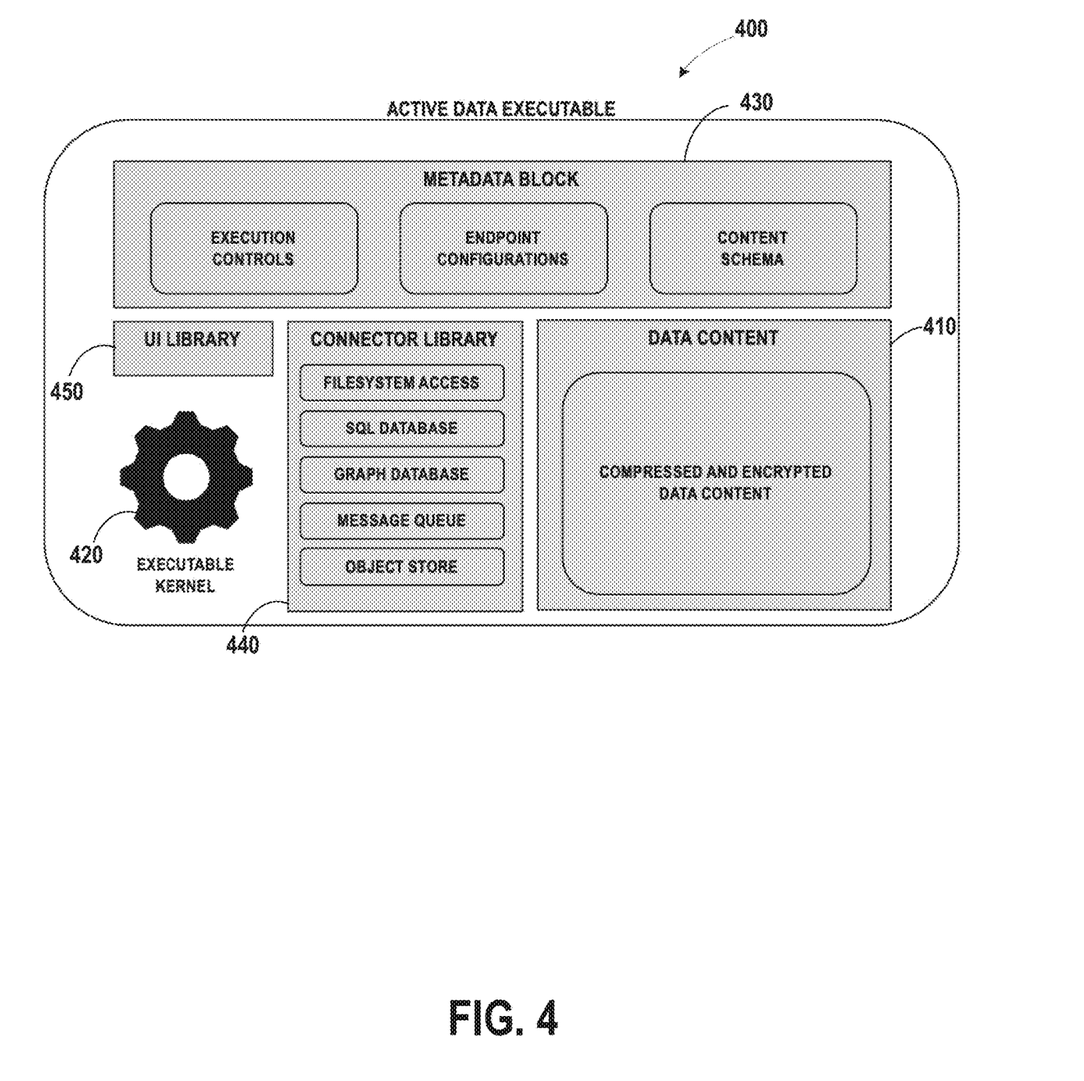
FIG. 4 depicts an example active data executable and its example components, according to one embodiment of the present disclosure.

Turning now to FIG. 4, one possible example of an ADE 400 and its components is illustrated. As shown in FIG. 4, the example ADE 400 may comprise data content 410 as well as various resources that facilitate the functionality described herein, including but not limited to an executable kernel 420, a metadata block 430, a connector library 440, and a UI library 450, among other possible resources. Each of these components of the example ADE 400 is discussed in further detail below.

In general, the data content 410 packaged into the ADE 400 may comprise any type of data content that could be transferred from a source system to a receiving system, including but not limited to the types of data content that may otherwise be found in a file format such as CSV, XML, JSON, Parquet, ORC, or Arvo, among many other possibilities. In line with the discussion above, the data content 410 may be represented in a default format that is destination-agnostic (e.g., independent of a format associated with any particular destination location) and thus amenable to being extracted into a specified format by the executable kernel 420 once it is executed. Further, as shown in FIG. 4, the data content 410 may also be compressed and/or encrypted. The data content 410 that is packaged into the ADE 400 may take other forms as well.

Although not shown in FIG. 4, it is also possible that, instead of containing the data content 410 itself, the example ADE 400 could alternatively include a reference to an external location where the data content 410 is stored and can be accessed, along with any necessary access information (e.g. credentials). This reference may comprise any form of pointer or link now known or later developed, including but not limited to a Uniform Resource Identifier (URI) (e.g., a Uniform Resource Link (URL)). This capability may permit the ADE to be much smaller than the requested data content and may facilitate streaming of potentially unbounded data from the external location.

In turn, the executable kernel 420 may comprise executable program instructions that, when executed by a processor of a receiving system, cause the data content 410 to be extracted in a specified format and stored into a specified destination location. In this respect, the program instructions included in the executable kernel may take any of various forms, examples of which may include machine code or byte code for a common virtual machine run time, among other possible forms. Additionally, the executable kernel 420 may also include associated program data (e.g., configuration information, security restrictions, etc.) that facilitates the functions of extracting the data content 410 in a specified format and causing the data content 410 to be stored into a specified destination location. The executable kernel 420 may take other forms as well.

The metadata block 430 may contain information that can be used by the ADE and/or the receiving system to connect to and cause the data content to be stored at the destination specified by a user of the receiving system. As shown in FIG. 4, the metadata block 430 may include information such as execution controls, endpoint configurations, and content schema. The execution controls may be used to govern the execution of the ADE. For example, the execution controls may include constraints on execution of the ADE. Such constraints may include requiring access credentials or private encryption keys to execute the ADE, requiring the ADE to be executed within a certain date and/or time window, or requiring the ADE to be executed by a machine having a particular hardware address. The endpoint configurations may contain information describing and permitting access to a set of storage destination locations that are accessible by the receiving system (e.g., storage destinations in the user's computing environment). Each endpoint configuration may provide a set of formats that are applicable to a particular endpoint. For example, a filesystem configuration may include mechanisms to produce CSV, JSON, WL, Parquet, ORC file formats. As another example, an SQL database configuration may include mechanisms to CREATE, INSERT, or UPDATE SQL text (based on interrogating a target table's structure as discussed in more detail below) or directly store the data content into the target database. As a specific example, if the user-specified destination is a database, the endpoint configurations may contain connection details such as the server name and port as well as access credentials, which may be supplied when the ADE executed. If the user-specified destination is a Kafka distributed log, then the endpoint configurations may include the broker location as well as suitable topic names. The content schema may be a destination-agnostic characterization of the data content containing structure definition, field names and types, and constraints on values. The metadata block 430 may also include other information not shown in FIG. 4.

The connector library 440 may include a set of components that enable the ADE and/or the receiving system to access a variety of destination locations. For example, the connector library 440 may provide access to Application Programming Interfaces (APIs) and data connectors that may be used by the ADE and/or the receiving system to connect to the destination location specified by the user. The connector library 440 may include connectors supporting a variety of systems or protocols including database providers, web services, cloud-based file sharing platforms, and spreadsheets. For example, as shown in FIG. 4, the connector library 440 may include a filesystem access connector, a SQL database connector (e.g., Oracle SQL Connector for HDFS and SQL server JDBC connection library), a graph database connector (e.g., Neo4J Java or Golang drivers), a message queue connector (e.g., Atom Queue), or an object store connector (e.g., libraries providing write access to Amazon S3 and Google Cloud Storage). The connect library may include other connectors not shown, such as an HTTP connector, a .NET connector, or an SAP connector. Other examples are also possible.

The UI library 450 may include resources for facilitating interaction between the receiving system and an associated user to allow the user to specify a desired format for the data content 410 and a desired destination location for the data content 410 to be stored. For instance, aspects of the UI library 450 may be used by the executable kernel 420 to present a UI that takes the form of a command line interface or a more complex GUI, among other possible types of UIs. The presented UI may then function to prompt the user to specify a desired format, a desired destination location, and any access information (e.g. credentials) necessary to access the specified destination location, receive the information provided by the user, and then pass that information to the executable kernel, among other possible functions.

The ADE may include other components as well.

For example, although not shown in FIG. 4, the ADE 400 may include a set of resources that enable the ADE to communicate with the source system to retrieve updated data content and transmit the updated data content to the receiving system, without the need for the receiving system to interact with the source system or send a request for updated data content.

It should be understood that example ADE 400 is one example of an ADE that may be assembled and used to transfer data content in accordance with the present disclosure. Numerous other arrangements are possible and contemplated herein. For instance, other ADE assemblies may include additional components not pictured and/or more or less of the pictured components.

B. Creating an Active Data Executable

Figure 5:
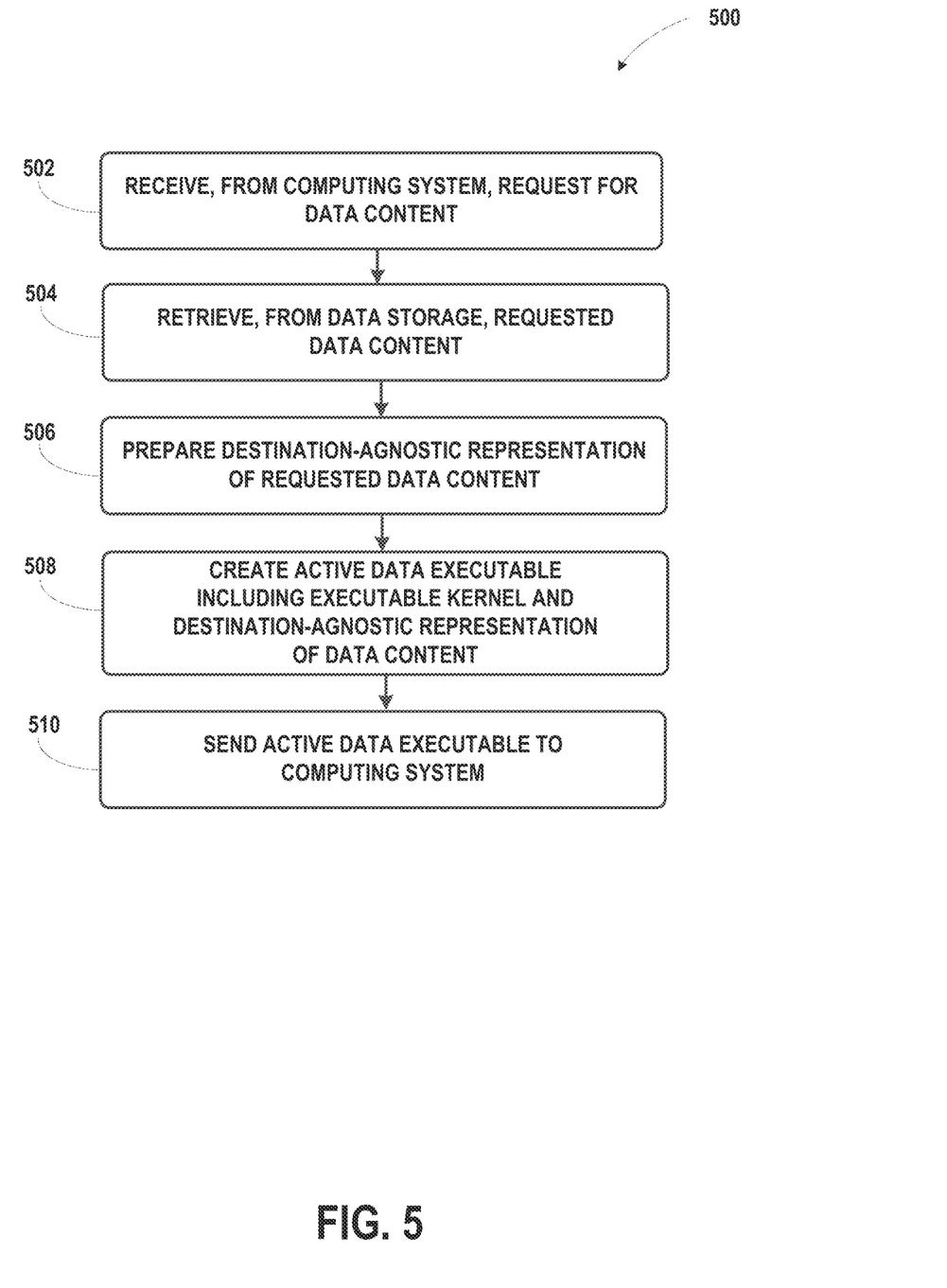
FIG. 5 depicts an example flow diagram illustrating example functions for creating an active data executable, according to one embodiment of the present disclosure.

Turning now to FIG. 5, an example flow diagram 500 illustrates example functions for creating an ADE, according to one embodiment of the present disclosure. The functions illustrated in FIG. 5 may be performed, for example, by the data distribution platform 102 shown in FIG. 1 and discussed above with respect to FIGS. 1 and 2.

At block 502 of FIG. 5, the data distribution platform 102 may receive a request for data content from a computing system such as the first computing system 112 shown in FIG. 1. The requested data content may take any of various forms. To illustrate with one possible example, the data distribution platform 102 may house data content related to an investment manager consisting of account data, stock or security data, price data, and holdings data, and the first computing system 112 may correspond to a risk manager who provides risk management evaluation for the investment manager. In this case, the requested data content may comprise any of the various types of data content that generally needs to be conveyed to the risk manager so that analysis can be performed by a risk engine, and by transmitting the requested data content via an ADE, the personnel at the risk manager could store the appropriate data content directly into the risk engine or its underlying database without having to use custom ETL tools that would be otherwise required to run the risk analysis. Numerous other examples and useful applications exist for the types of data content that may be transferred using an ADE.

It should also be understood that the process of creating an ADE could also be triggered by various other triggering events, examples of which may include a request from a user of the data distribution platform 102, a request from a computing system other than the one that is to receive the data content, a determination by the data distribution platform 102 that certain data content should be sent to a computing system at a particular time (e.g., based on a schedule), a determination by the data distribution platform 102 that certain data content has been updated and should be re-sent via an ADE, or upon the satisfaction of certain other conditions, among other possibilities.

At block 504, after receiving the request for the data content from the computing system, the data distribution platform 102 may retrieve the requested data content, which may be stored in data storage 204, for example.

In some implementations, as noted above, the data content may already be stored in the data distribution platform 102 as raw data content that is in a destination-agnostic format (e.g., independent of association with any particular format). For example, the data distribution platform 102 may include data extracts that are developed to be destination- or format-agnostic, deferring the decision of the destination locations and output formats to the actual consumers. In such implementations, the data distribution platform 102 is only responsible for determining the data content to be distributed, and the data distribution platform 102 may retrieve the data content in its destination-agnostic form and then proceed with creation of the ADE.

However, in other implementations, the data content may be stored in a particular format, such as in a particular file format in which the data content was encoded when originally received by the data distribution platform 102 and/or a particular format that is used internally by the data distribution platform 102 but is not directly usable outside the data distribution platform 102. In such implementations, at block 506, the data distribution platform 102 may prepare a destination-agnostic representation of the requested data content that may then be encoded into a format that is later specified by a user of the computing system.

In still other implementations, the data content may be stored at an external source rather than at the data distribution platform 102, in which case the data distribution platform 102 may generate and/or retrieve a reference to the requested data content (e.g., a pointer or link such as a URI) rather than retrieving the requested data content itself.

At block 508, the data distribution platform 102 may then create the ADE, which may include several components, as discussed above with reference to FIG. 4. For example, the ADE may combine an executable kernel with the destination-agnostic representation of the requested data content and metadata that describes the structure of the data content. The executable kernel may be, for example, machine code or byte code for a common virtual machine runtime. In the case of machine code, the ADE could be dynamically assembled and cross-compiled into the target machine's architecture, or multiple ADEs could be available—one for each mainstream computer architecture of interest to consumers.

In some implementations, the executable kernel of the ADE being created by the data distribution platform 102 may include program code that, when executed, provides for a series of interactive prompts that may be provided via a UI that is presented at the computing system where the executable kernel is executed. For example, running the executable kernel of the ADE on the first computing system 112 may cause the first computing system 112 to present a TUI such as a command line interface on a display associated with the first computing system 112. The command line may be configured to prompt the user to indicate information regarding the requested data content, such as a desired format for the data content and an ultimate destination location where the data content should be stored. In another example, the UI may be a more extensive GUI that the user may interact with to make selections regarding the data content format and destination location. Command line parameters or configuration files could be used to determine the destination location and format details as well. Other examples of user interfaces or configuration files for scripting the execution of the execution of the ADE are also possible, including combinations thereof.

Additionally, the executable kernel of the ADE being created by the data distribution platform 102 may include program code that, when executed, is operable to extract the arbitrary representation of the requested data content in one or more formats that are specified by user of the computing system 112 and then cause the formatted data content to be stored at a destination location that is specified by the user.

In this respect, the executable kernel may be capable of extracting the data content into any of various different formats, examples of which may include format for storage on a filesystem (e.g., CSV, XML, JSON, Parquet, or Avro), a format for storage in a relational database, or a format for storage in a distributed log, among various other possibilities.

Further, the executable kernel may contain or otherwise interface with libraries and other code that provide access to a wide range of possible destination locations to make use of the data content. Examples include database drivers for popular relational database management systems, and drivers for accessing message queues and distributed log systems. In some implementations, a data distribution platform 102 that distributes data via an ADE may build different ADE versions that target different types of destination locations, or it may allow the consumer to select the desired destination locations, thus incorporating only library code that would likely be used.

As noted above, some example destination locations where the data content may be stored include a relational database, a non-relational database, a message queue system, a distributed log system (such as Apache Kafka), and a cloud storage system (such as AWS Cloud Storage), among other examples. In this respect, the ADE may be operable to provide a user with prompts and/or menus to guide the user, via the example UIs discussed above, to provide access information (e.g., credentials) corresponding to the selected destination location, or database information such as field and record names, as discussed in more detail below. In this way, the ADE possesses the ability to cause the data content to be stored in different types of destination locations. This provides an improvement over current solutions where, even if the user has received the data content in a correct format, the burden of extracting the data content from a passive file and storing it into the desired destination location is placed on a user of the receiving system. This generally requires the user to provide a separate mechanism for storing the data content to the destination location, such as by procuring and running ETL software for deciphering the data content according to the user specifications.

In some implementations, the ADE that is created by the data distribution platform 102 may include the capability (e.g., via program code included in the ADE's executable kernel) to interrogate the user-selected destination location directly in order to determine the schema by which the other data therein is organized. This may allow the ADE to prepare the requested data content accordingly for storing into the selected destination location. In such a case, the results of the destination schema interrogation may be used to guide the consumer's choices regarding what data content can be published to the destination location.

During the initial request for the data content, the user of the first computing system 112 may also specify certain security constraints on the ADE, such that it can only be run on a specific device, in a specific environment, or in a specific timeframe. The data distribution platform 102 may then create the ADE accordingly. For example, the user may request that the executable kernel of the ADE be locked with an encryption key, such that it can only be executed once the private key is provided. As another example, the user may specify that the executable kernel can only be executed by a computing device having a designated network address. As yet another example, the user may specify that the executable kernel be formatted to run on a particular operating system. Further, the user may specify an expiration date or time for the ADE, such that the executable kernel cannot be run after the expiration period passes. In each case, the data distribution platform 102 may take the specified conditions into account when creating the ADE. Numerous other examples, including combinations of multiple security constraints, are also possible.

In other implementations, the data distribution platform 102 may dynamically assemble the ADE for individual consumers and only incorporate the output mechanisms and content subsets for which the consumer has interest.

The function of creating the ADE may take various other forms as well.

At block 510, the data distribution platform 102 may send the ADE created at block 508 above to the first computing system 112. For example, the data distribution platform 102 may send the ADE over the respective communication path 110, as shown in FIG. 1 and discussed previously. As mentioned above, the only information provided by the user to the data distribution platform 102 prior to the data distribution platform 102 sending the ADE is an identification of the requested data content (and perhaps any desired security constraints as discussed above). Consequently, no potentially private information such as access credentials or similar information regarding the receiving system (e.g. the user's computing environment) is transmitted to the data distribution platform 102. In this way, operation of the data distribution platform 102 may be simplified, as security measures to protect these types of private user data are not likely to be required.

C. Running an Active Data Executable

Figure 6:
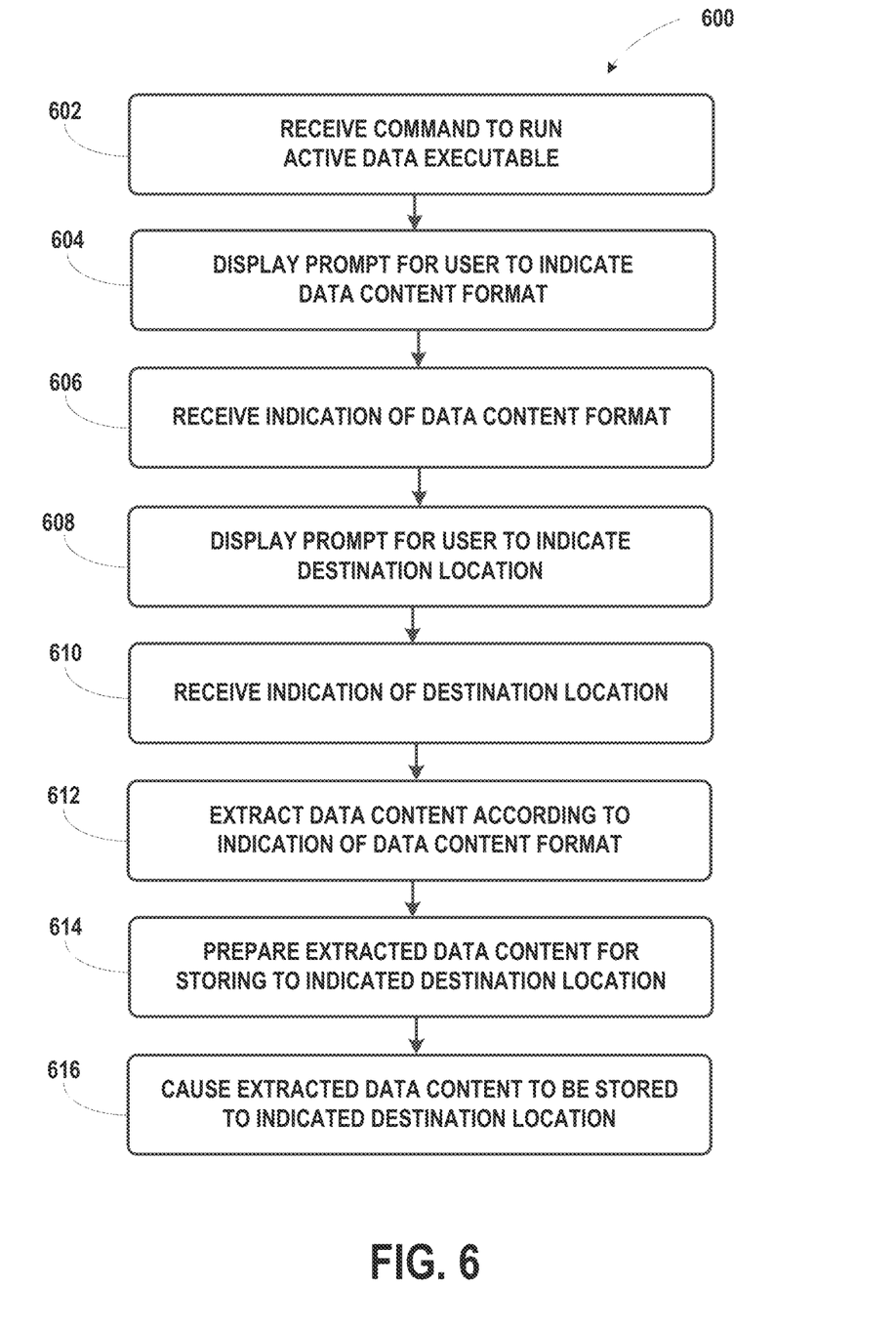
FIG. 6 depicts an example flow diagram illustrating example functions for running an active data executable, according to one embodiment of the present disclosure.

FIG. 6 depicts an example flow diagram 600 illustrating example functions for running an ADE according to one embodiment of the present disclosure. The functions shown in FIG. 6 may be performed by a computing system, such as the first computing system 112 shown in FIG. 1 and discussed above, that has received the ADE and is capable of running the executable kernel of the ADE. For instance, after requesting the data content from the data distribution platform 102, the first computing system 112 may receive the ADE created by the data distribution platform 102 as detailed above, where the first computing system 112 may then execute the ADE (e.g., at the request of a user).

As shown in FIG. 6, at block 602, the first computing system 112 may receive a command to run the ADE. For example, the user of the first computing system 112 may issue a command via an interface of the first computing system 112 such as a mouse, keyboard, touchscreen, and the like. The command may also take the form of a voice command, for instance. The run command may take other forms as well. Whatever its form, the command may trigger the first computing system 112 to run the executable kernel of the ADE (e.g., by executing the executable kernel via at least one processor of the computing system).

At block 604, the while running the executable kernel, the first computing system 112 may display a first prompt for the user to indicate a data content format via a user interface. As discussed in the examples above, the user interface may take the form of a TUI, a GUI, or some other interface that allows the user to input information related to the extraction of the data content from the ADE (e.g., a specified format for the data content). For example, the UI may prompt the user to enter text indicating a file extension (e.g., .xlsx, .csv, or .json) or other alphanumerical code that corresponds to a desired format for the data content. If the user enters a format that the ADE is unable to produce, the computing system 112 may display a message stating so, and may then prompt the user to select a different format. In another example, the first computing system 112 may cause the user interface to display a menu prompting the user to select from a list of possible formats into which the data content is capable of being extracted. In yet another example, the first computing system 112 may present the prompts discussed herein as audible prompts. Numerous other possibilities also exist, including a combination of these and other examples.

At block 606, while running the executable kernel, the first computing system 112 may receive, via the user interface, an indication of a specified format for the data content. As noted above, the indication of the specified format for the data content may be received by the first computing system 112 as a text entry, a menu selection, or perhaps a voice input, among other possibilities.

At block 608, while running the executable kernel, the first computing system 112 may display a second prompt for the user to indicate, via the user interface, a destination location for the extracted data content to be stored. For example, possible destination locations may include a particular database, message queue system, or distributed log system, as discussed above. As another example, the ADE may display a list of available endpoints defined in the endpoint configurations section of the metadata block 430. As yet another example, the ADE may allow the user to enter one or more new endpoints, which the ADE may then proceed to access.

At block 610, while running the executable kernel, the first computing system 112 may receive, via the user interface, an indication of the destination location. The indication of the destination location may take any of the various forms discussed herein, including but not limited to a file path, a network address, or the like.

In some implementations, while running the executable kernel, the computing system 112 may also present a series of prompts at block 608 that may guide the user to first indicate the destination location for the data content to be stored, and then provide any required access information (e.g., credentials) that may be needed to access the indicated destination location. Accordingly, the first computing system 112 may receive such data at block 610 in a series of inputs via the user interface. In this way, blocks 608 and 610 may be repeated several times.

For example, if the desired destination location for the data content is a relational database, the access information may include the server name and port where the database resides. Further, the access information may include a username and password, the name of the database, and an identification of a particular table in the database where the user desires the data content to be stored. In some implementations, the user may specify, via the user interface, translation of data content field names to the table's column names.

As another example, if the desired destination location for the data content is a distributed log system, the ADE may contain code that allows it to create a publishing client and then use that client to connect to the log system. After the user indicates the log as the destination location for the data content, the first computing system 112 may then interact with the user via the user interface to gather relevant access details, including the server name and port as well as the topic that will receive the data content. For example, if the user desires that the log messages are published with a key, the interaction with the publication user interface of the ADE may let the user specify how the key is to be constructed. Additionally, the format of the message content, such as a JSON representation or a CSV file, may be specified. Ultimately, the ADE may use an internal Kafka Publication Library to publish the data content to the distributed log using a message key and content serialization details configured via the ADE's interaction with the user of the receiving system. Specifically, each data record contained within the ADE may be published as a log message with a key constructed from some combination of the record's values and environment context. Additional configuration parameters, such as rate limits, may be established.

Notably, the user may be prompted by the ADE to provide secure access information, which may frequently include private information, after the ADE has been created by the data distribution platform 102 and transmitted to the first computing system 112. Thus, no private information is transmitted to the data distribution platform 102. This may be desirable over an alternative system in which a user provides such private access credentials to the data distribution platform 102 along with the initial request for data content. In this way, the ADE may enable the data distribution platform 102 to directly store the data content into a secured destination location.

In some other implementations, the ADE may also include program instructions that, when executed by the first computing system 112, may interrogate the user-specified destination location in order to obtain the necessary access information and determine how to store the requested data content into the destination location. In some cases, this may be preferable to gathering information regarding the destination location from the user in a series of prompts via the user interface.

At block 612, while running the executable kernel, the computing system 112 may extract the data content according to the indication of the data content format received at block 606. For example, the ADE may include configuration information (e.g., formatting data) that provides the basis by which the executable kernel can extract the data content into the specified format, as discussed above. By including metadata describing the data content, the data content packaged in the ADE may be published multiple times in multiple formats. Each output format may invoke a different generation template which, when merged with the data content, can materialize destination-specific artifacts. In this way, the computing system 112 may extract data content which is represented in a destination-agnostic format and apply the user-specified format to the data content. In an example where the ADE includes a reference to an external location (e.g. a URI or a URL) for the requested data content instead of the data content itself as discussed above, the computing system 112 may use the reference provided in the ADE to obtain the requested data content from the external source and then extract the data content to the user-specified format.

At block 614, while running the executable kernel, the first computing system 112 may prepare the extracted data content to be stored into the indicated destination location. This preparation of the extracted data content may be based on characteristics of the indicated destination location that were received by the first computing system 112 at block 610. For example, the first computing system 112 may translate data content field names to a destination database's column names, based on information provided by the user at block 610 or obtained by the ADE during an interrogation of the destination database. Numerous other examples are also possible.

At block 616, while running the executable kernel, the first computing system 112 may cause the extracted data content to be stored into the indicated destination location. In some embodiments, block 614 and 616 may be performed substantially concurrently. In this way, the ADE disclosed herein may serve as both a data delivery package as well as a mechanism for storing the data content into the desired destination location. This may reduce or eliminate the need for intermediate data transfer mechanics that are currently required according to conventional data delivery methods.

FIG. 5 and FIG. 6 include one or more operations, functions, or actions as illustrated by one or more of blocks 502-510 and blocks 602-616. Although the blocks are illustrated in sequential order, some of the blocks may also be performed in parallel, and/or in a different order than those described herein. Also, the various blocks may be combined into fewer blocks, divided into additional blocks, and/or removed based upon the desired implementation.

For example, with reference to the flow diagram 600, the first computing system 112 running the ADE may prompt the user to indicate a desired storage destination location for the data content, discussed above at block 608, before prompting the user to indicate a desired format, discussed above at block 604. In some cases, the indication of the destination location may inform or constrain the format choices that are presented to the user. Thus, the characterization of these prompts above as a "first" prompt and a "second" prompt may be reversed. Other variations are also possible.

In addition, for the flow diagrams in FIG. 5 and FIG. 6 and other processes and methods disclosed herein, the diagrams show functionality and operation of one possible implementation of present embodiments. In this regard, each block may represent a module, a segment, or a portion of program code which includes one or more instructions executable by one or more processors for implementing logical functions or blocks in the process.

D. Illustrative Example

Figure 7:
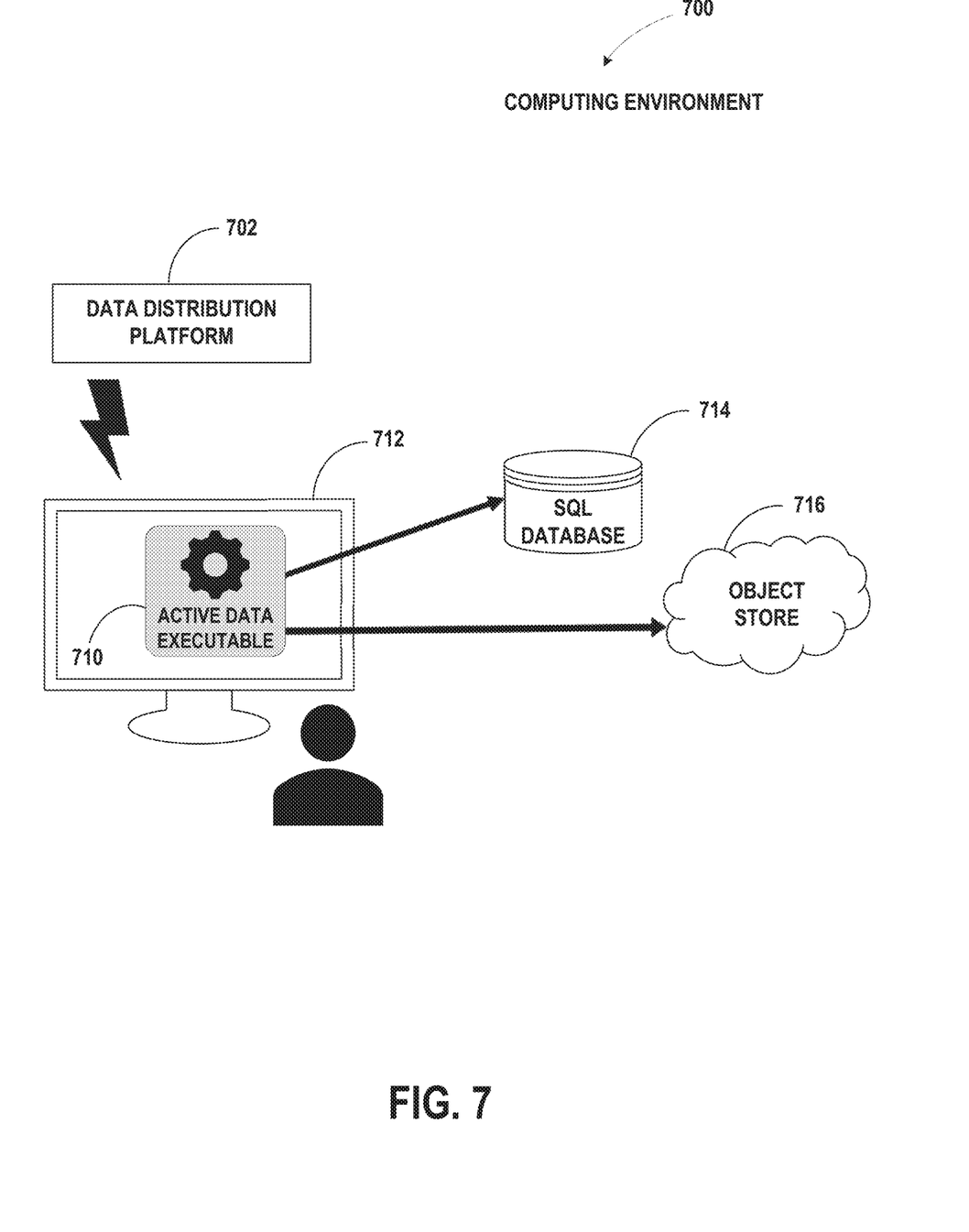
FIG. 7 depicts an example computing environment, according to one embodiment of the present disclosure.

Turning to FIG. 7, one possible example of how an ADE may be utilized within an example computing environment 700 is shown. As shown in FIG. 7, a data distribution platform 702 (which may take the form of any computing system that is capable of creating and transmitting an ADE) may receive a data content request from an example computing system 712 via a communication network or the like. In response to receiving such a request, the data distribution platform 702 may next prepare an ADE 710 that contains the requested data content and then transmit the ADE 710 to the computing system 712 via the communication network.

At some point after receiving the ADE 710 from the data distribution platform 702, the computing system 712 may execute the executable kernel of the ADE, which may then prompt a user of the computing system 712 to specify (i) a desired format into which the data content should be extracted and (ii) a desired destination location where the data content should be stored. For instance, in the example shown in FIG. 7, the user may request that the data content be extracted (i) in a relational database format that is to be stored in an SQL database 714 that is communicatively coupled to the computing system 712 and (ii) in an object-store format that is to be stored in an object store 716 that is communicatively coupled to the computing system 712.

It should be understood that the diagram shown in FIG. 7 depicts only one example of a computing environment and that other examples are also possible. For example, a computing environment may comprise more than one computing system, and more than one storage destination location may be specified by the user. Other variations are also possible.

IV. Conclusion

Example embodiments of the disclosed innovations have been described above. Those skilled in the art will understand, however, that changes and modifications may be made to the embodiments described without departing from the true scope and sprit of the present invention, which will be defined by claims.

For instance, those in the art will understand that the disclosed approach for delivering an ADE to a user that provides for post-delivery, user-specified formatting of data content and storing of the data content into a user-specified destination location may be implemented in other areas related to data delivery.

Further, to the extent that examples described herein involve operations performed or initiated by actors, such as "operators," "users" or other entities, this is for purposes of example and explanation only. Claims should not be construed as requiring action by such actors unless explicitly recited in claim language.

The invention claimed is:

1. A non-transitory computer-readable medium having stored thereon:
an active data executable (ADE) comprising (i) a representation of given data content that is combined with (ii) an executable kernel that, when executed, causes the given data content to be extracted in a user-specified data format and provided to a user-specified destination location for storage.

2. The non-transitory computer-readable medium of claim 1, wherein the ADE comprises program instructions for providing a user interface that enables a user to input an indication of (i) the user-specified data format for the given data content and (ii) the user-specified destination location for the given data content.

3. The non-transitory computer-readable medium of claim 2, wherein the user interface further enables a user to input access information for the user-specified destination location for the given data content.

4. The non-transitory computer-readable medium of claim 1, wherein the ADE further comprises a connector library that contains connectors for two or more different types of destination locations.

5. The non-transitory computer-readable medium of claim 1, wherein the ADE further comprises metadata information that includes one or more of (i) execution controls for the ADE, (ii) endpoint configuration information for two or more different types of destination locations, or (iii) content schema for the given data content.

6. The non-transitory computer-readable medium of claim 1, wherein the user-specified destination location for the given data content is selectable from a set of different destination locations that comprises at least two of a file-system of a computing system, a relational database, a non-relational database, a message queue, a distributed log system, or a cloud storage system.

7. The non-transitory computer-readable medium of claim 1, wherein the representation of the given data content is in a form that is independent of any user-specified format in which the given data content is to be extracted.

8. The non-transitory computer-readable medium of claim 1, wherein the ADE further comprises resources for obtaining an updated version of the given data content after execution of the ADE.

9. A computing platform comprising:
a communication interface;
at least one processor; and
at least one non-transitory computer-readable medium comprising program instructions that are executable by the at least one processor such that the computing platform is configured to:
create an active data executable (ADE) comprising (i) a representation of given data content that is combined with (ii) an executable kernel that, when executed, causes the given data content to be extracted in a user-specified data format and provided to a user-specified destination location for storage; and
transmit the ADE, via the communication interface, to a computing system.

10. The computing platform of claim 9, wherein the at least one non-transitory computer-readable medium comprises program instructions that are executable by the at least one processor such that the computing platform is configured to:
before creating the ADE, receive, from the computing system via the communication interface, a request for the given data content that respectively triggers the computing platform to create the ADE.

11. The computing platform of claim 10, wherein the request for the given data content comprises at least one security condition for controlling access to the given data content that is to be used when creating the ADE.

12. The computing platform of claim 9, wherein the program instructions that are executable by the at least one processor such that the computing platform is configured to create the ADE comprise program instructions that are executable by the at least one processor such that the computing platform is configured to:
obtain the representation of the given data content;
obtain the executable kernel; and
assemble the representation of the given data content and the executable kernel into a single data package.

13. The computing platform of claim 9, wherein the ADE comprises program instructions for providing a user interface that enables a user to input an indication of (i) the user-specified data format for the given data content and (ii) the user-specified destination location for the given data content.

14. The computing platform of claim 13, wherein the user interface further enables a user to input access information for the user-specified destination location for the given data content.

15. The computing platform of claim 9, wherein the ADE further comprises a connector library that contains connectors for two or more different types of destination locations.

16. The computing platform of claim 9, wherein the ADE further comprises metadata information that includes one or more of (i) execution controls for the ADE, (ii) endpoint configuration information for two or more different types of destination locations, or (iii) content schema for the given data content.

17. The computing platform of claim 9, wherein the user-specified destination location for the given data content is selectable from a set of different destination locations that comprises at least two of a filesystem of the computing system, a relational database, a non-relational database, a message queue, a distributed log system, or a cloud storage system.

18. The computing platform of claim 9, wherein the representation of the given data content is in a form that is independent of any user-specified format in which the given data content is to be extracted.

19. The computing platform of claim 9, wherein the ADE further comprises resources for obtaining an updated version of the given data content after execution of the ADE.

20. A computer-implementated method comprising:
creating an active data executable (ADE) comprising (i) a representation of given data content that is combined with (ii) an executable kernel that, when executed, causes the given data content to be extracted in a user-specified data format and provided to a user-specified destination location for storage; and
transmitting the ADE, via a communication network, to a computing system.

* * * * *